July 9, 1968 C. H. BARNES 3,391,811
REFUSE COLLECTION VEHICLES AND THE LIKE
Filed Oct. 22, 1965 3 Sheets-Sheet 1
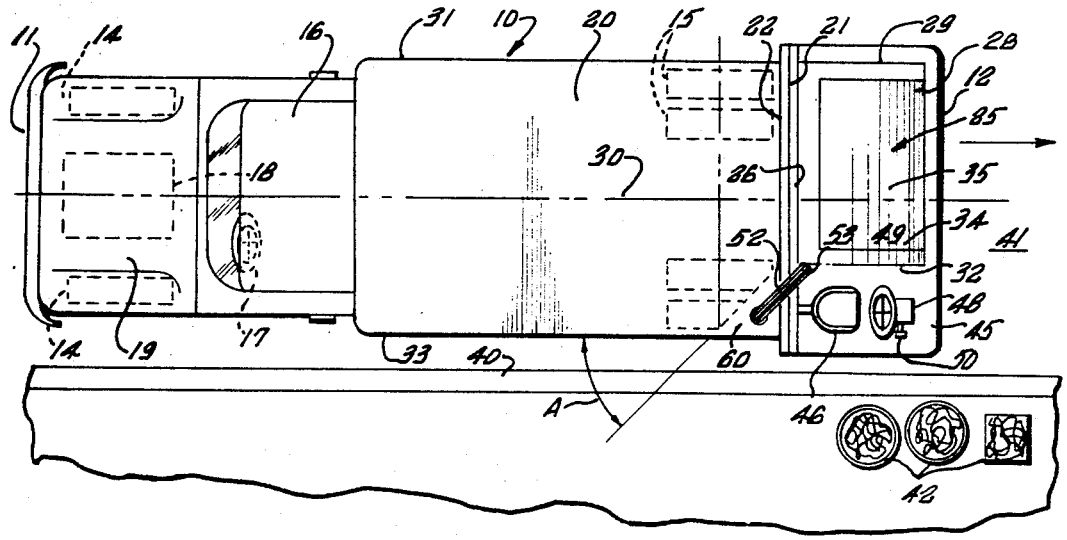
FIG_1_
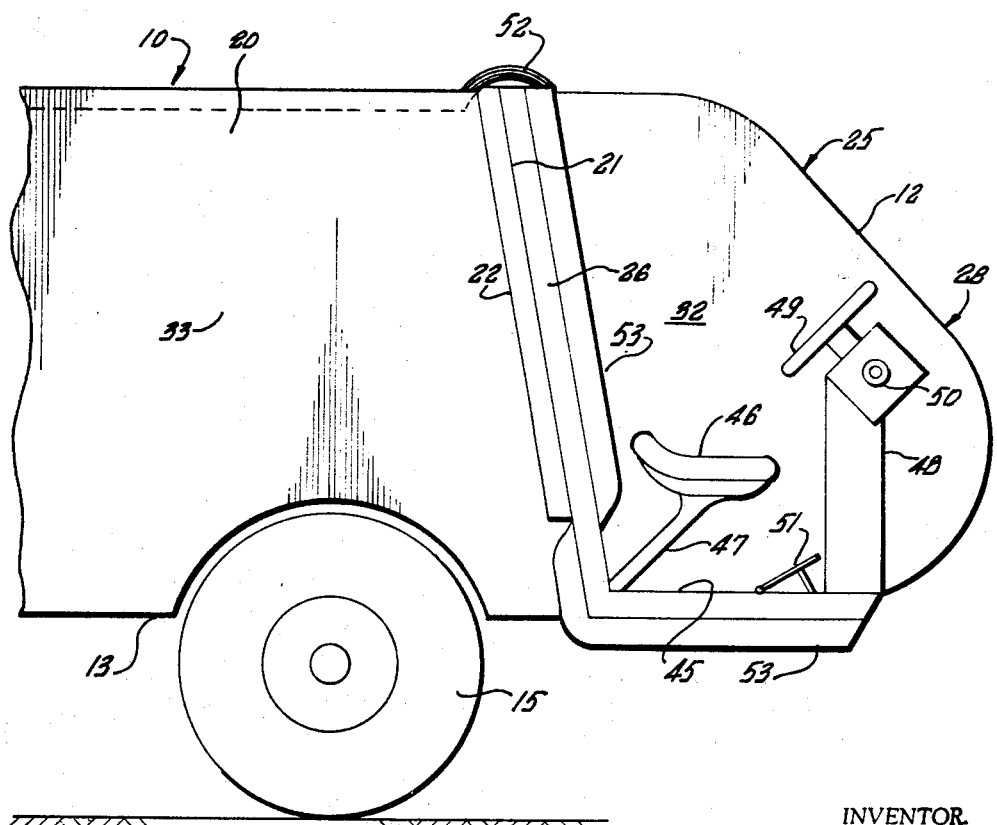
FIG_2_
INVENTOR.
CHARLES H. BARNES
BY
ATTORNEYS July 9, 1968  C. H. BARNES  3,391,811
REFUSE COLLECTION VEHICLES AND THE LIKE
Filed Oct. 22, 1965  3 Sheets-Sheet 2
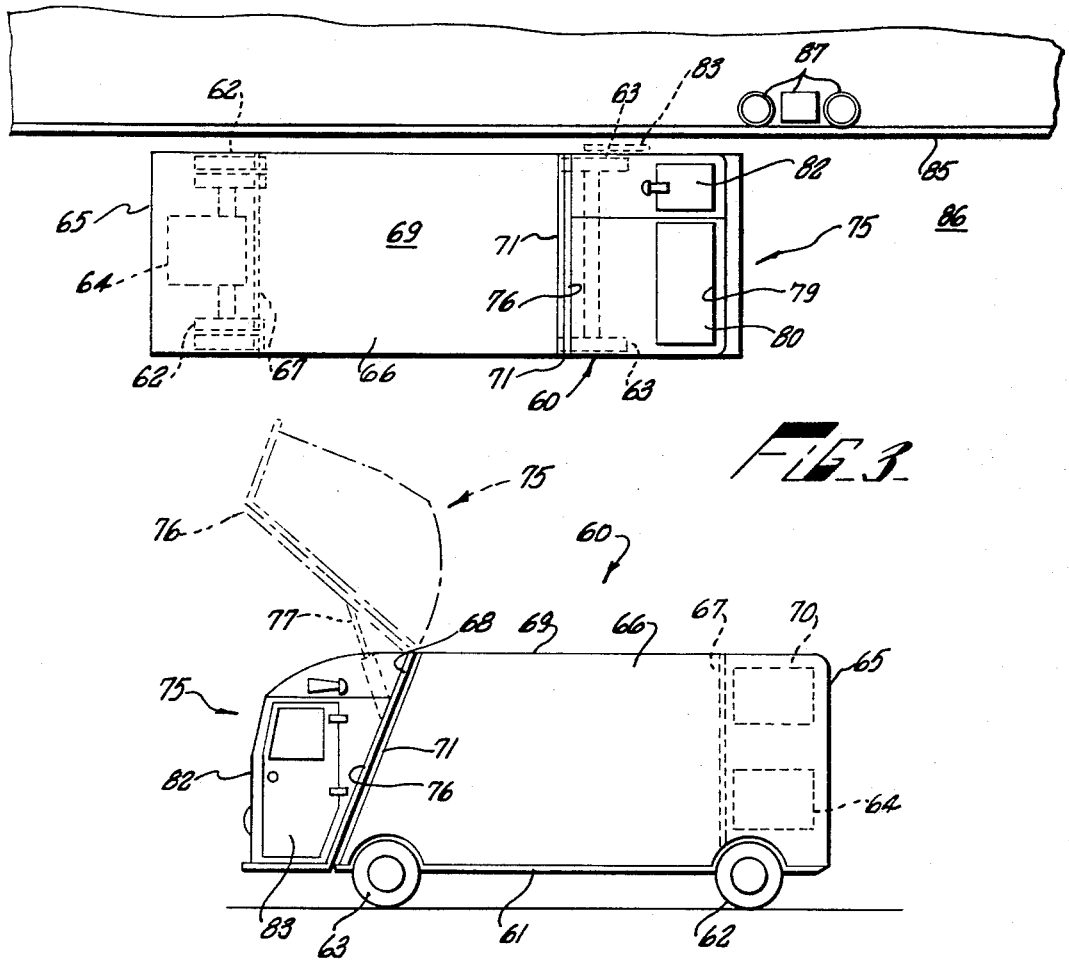
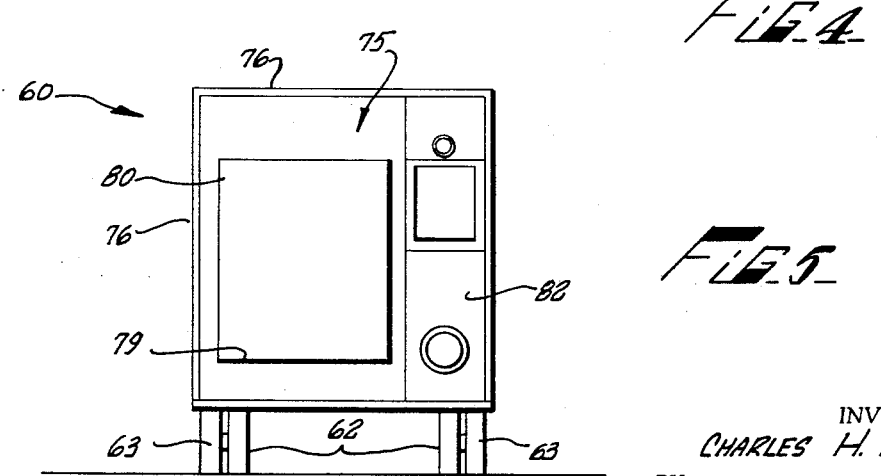
INVENTOR.
CHARLES H. BARNES
BY
ATTORNEYS.

July 9, 1968  C. H. BARNES  3,391,811
REFUSE COLLECTION VEHICLES AND THE LIKE
Filed Oct. 22, 1965  3 Sheets-Sheet 3
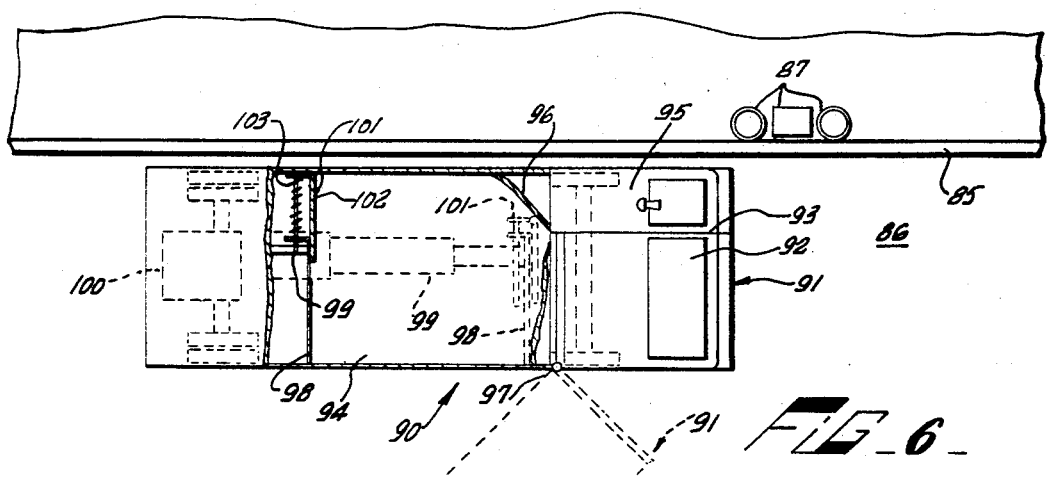
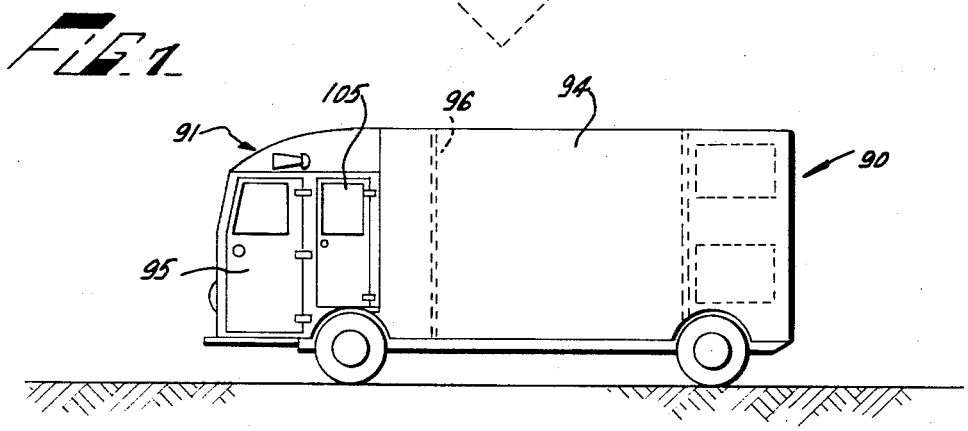
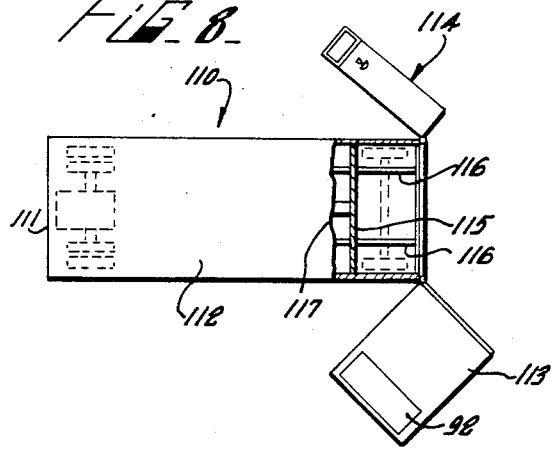
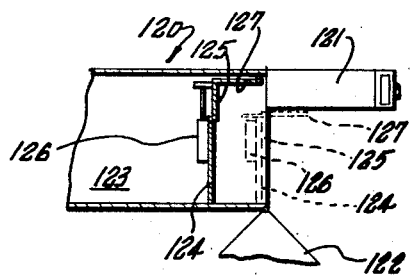
INVENTOR.
CHARLES H. BARNES
BY
ATTORNEYS.

United States Patent Office 3,391,811
Patented July 9, 1968

3,391,811
REFUSE COLLECTION VEHICLES
AND THE LIKE
Charles H. Barnes, Glendale, Calif., assignor of one-third to Robert J. Barry, Los Angeles, Calif.
Continuation-in-part of application Ser. No. 284,958, June 3, 1963. This application Oct. 22, 1965, Ser. No. 501,412
3 Claims. (Cl. 214—500)

ABSTRACT OF THE DISCLOSURE

A refuse collection vehicle having a propulsion engine at one end of the vehicle, a refuse collection bin on the chassis, and a bin closing gate across the vehicle at its other end, the gate defining a trough-like refuse input hopper. A control station for controlling driving operation of the vehicle is located laterally of the hopper and is arranged so that an operator using the station to control driving of the vehicle normally faces away from the engine end of the vehicle.

---

This application is a continuation-in-part of application for United States Letters Patent Ser. No. 284,958, filed June 3, 1963 for Improvements in Special Purpose Vehicles, now patent 3,233,765, issued Feb. 8, 1966.

This invention relates to service-type vehicles such as refuse collection trucks and, more particularly, to improve means for controlling such vehicles during periods in which the vehicle is engaged in its special service function whereby the number of persons required to operate such vehicles is reduced.

The structures of existing refuse collecting vehicles have been predicated upon the configuration of conventional truck bodies. The methods of operation of such vehicles have been dependent upon methods of operation of conventional trucks in that the refuse collecting, compacting and storing devices thereof are built around conventional truck chassis which have conventional drive mechanisms. These trucks have a single and fixed control station at the forward end of the vehicle which is used to control the vehicle both in transit from the garage or parking yard to the refuse collecting route and upon the refuse collecting route. These vehicles require a driver and one or more refuse loaders, the latter being referred to in the trade as "swampers," as personnel of a refuse truck crew. It is especially on routes for collection of refuse in residential areas that the practices of operation of prior refuse collecting vehicles are inefficient. This is true since the driver works while the swampers are idle, and the swampers load the vehicle while the driver waits to drive the vehicle to the next pick-up station. Most commonly, the vehicle is loaded through a hopper located in a movable gate assembly disposed across the rear of a refuse storage bin mounted to the chassis of the vehicle. Where the driver doubles as a swamper, at each refuse collecting station the driver must climb out of the cab, walk from the truck cab to the refuse hopper at the rear of the vehicle and then back to the cab.

In an attempt to improve the operational efficiency of such vehicles, some refuse collection vehicles have been provided with auxiliary control stations on the running board of a conventional cab on the curbside of the vehicle. Such modified vehicles still require that the driver walk from the refuse hopper to the auxiliary control station at the forward end of the vehicle in order to drive the vehicle between refuse pick-up stops.

One embodiment of the present invention provides an auxiliary vehicle control station on the gate assembly immediately adjacent to the refuse hopper of a refuse collecting vehicle of the type referred to above. When the vehicle is moving from stop to stop on a refuse collection route, the driver operates the vehicle from the auxiliary control station. The operator is thus able to function efficiently both as a driver and as a swamper. The auxiliary control station includes a driver support member which is fixed to the gate assembly in such a manner that the vehicle complies with local, State and Federal vehicle width restrictions and may be driven on highways and freeways without a special operating permit.

Another embodiment provides a refuse collection vehicle having a single control station mounted to the hinged gate assembly which closes one end of a refuse storage bin. The gate assembly includes a hopper mechanism for receiving refuse and the like and for compacting the collected refuse and for transferring the same to the bin. The control station is located immediately adjacent the hopper mechanism and thus is convenient to the hopper mechanism so that a single person can both drive the vehicle and load it efficiently.

Generally speaking, this invention provides a refuse collection vehicle comprising a wheeled chassis and means for propelling the vehicle including an engine mounted to the chassis adjacent one end of the chassis. A refuse storage bin is substantially fixedly mounted to the chassis adjacent the side of the engine opposite from the one end of the chassis. The bin extends from adjacent the engine to the other end of the vehicle. Also, the bin extends across the width of the chassis and defines substantially the maximum width of the vehicle. The bin has a closed top and is open at the other end of the chassis. A gate assembly extends across the bin transversely of the vehicle at the other end of the chassis for closing the open end of the vehicle. Means are provided for hingeably mounting the gate assembly to the bin. The vehicle also includes selectively operable means connected between the bin and the gate assembly. The selectively operable means are operable for moving the gate assembly hingeably relative to the bin into and out of closure relation to the bin. The gate assembly carries refuse hopper means for receiving refuse and for transferring received refuse to the bin. A vehicle control station for an operator of the vehicle is mounted to the gate assembly laterally of the refuse hopper means and substantially within the maximum width of the vehicle. The control station includes means operable by the operator for controlling the direction and rate of vehicle movement.

The above mentioned and other features of the invention are more completely set forth in the following detailed description of the invention taken in conjunction with the accompanying drawings, wherein:

FIG. 1 is a top plan view of a refuse collection vehicle according to the present invention;

FIG. 2 is a side elevation view of a rear portion of the vehicle illustrated in FIG. 1;

FIG. 3 is a top plan view of another vehicle according to this invention;

FIG. 4 is a side elevation view of the vehicle shown in FIG. 3;

FIG. 5 is a front elevation view of the vehicle shown in FIGS. 3 and 4;

FIG. 6 is a top plan view of another vehicle according to this invention;

FIG. 7 is a side elevation view of the vehicle shown in FIG. 6;

FIG. 8 is a top plan view of another vehicle according to this invention; and

FIG. 9 is a fragmentary top plan view with parts broken away of another refuse ejection mechanism for use in the vehicle shown in FIG. 8.

A refuse collection truck 10 shown in FIGS. 1 and 2 has a front end 11, a rear end 12, and a chassis 13 mounted on front steerable wheels 14 and on rear drive wheels 15. The truck also has a control cab 16 for an operator of the vehicle and which is mounted to the front end of the chassis. The control cab includes mechanisms, such as steering wheel 17, operable by an operator or driver for controlling the speed and direction of movement of the vehicle in its principal mode of operation. An engine 18 for propelling the vehicle is mounted under a hood 19 of the vehicle forwardly of the control cab. Preferably the truck is equipped with an auxiliary transmission or a two-speed rear axle so that the truck has at least two speeds in reverse.

An enclosed refuse storage bin 20 is mounted to chassis 13 rearwardly of the control cab. The bin has an open rear end 21 partially encompassed by gate hinge structural members 22 which impart structural rigidity to the bin about its rear end. The bin is fixed to the chassis in the sense that the bin is not readily removable from the chassis. The bin, however, may be hinged at its rear end to the rear end of the chassis so that it can be pivoted upwardly relative to the chassis by means (not shown), such as a hydraulic ram connected between the chassis and the bin forwardly of the rear end of the chassis, to cause refuse accumulated in the bin to be discharged by gravity from the bin. Alternatively, a pusher plate (not shown) may be disposed in the bin for pushing refuse collected in the bin out of the bin to unload the truck.

A gate assembly 25 is connected to the rear of bin 20 and, in its usual position shown in the drawings, closes the open rear end of the bin. The gate assembly includes structural members 26 which extend around an open front end of the gate assembly to impart rigidity to the gate assembly. The gate assembly is mounted to the bin for hingeable movement relative to the bin about the upper limit of the bin rear opening so that the bin can be unloaded from time to time.

The gate assembly includes a refuse hopper 28 having a first side wall 29 disposed substantially parallel to a longitudinal centerline 30 of the vehicle closely adjacent a right side wall 31 of the refuse storage bin. The hopper also has a second side wall 32 extending substantially parallel to centerline 30 and spaced inwardly a predetermined distance of the vehicle from a left side wall 33 of the bin. The gate assembly may have a width slightly greater than the width of bin 20 as shown in FIG. 1, in which case the gate assembly defines the maximum width of the vehicle. The maximum width of the vehicle is such that the vehicle can be operated regularly on highways without the need for special operating permits. The refuse hopper also has a refuse loading opening 34 extending the greater portion of the distance between hopper walls 29 and 32 and opening to the rear of the vehicle. The loading opening is closed by a door 35 when desired.

While such structure is not shown in the drawing since it does not, in itself, form a part of this invention, gate assembly 25 includes a loading mechanism which is periodically operated to transfer refuse loaded into the hopper to the storage bin and to compact refuse accumulated in the pin. The loading mechanism may be in accord with the teachings of U.S. Patents 2,879,906 and 2,975,913, if desired.

The refuse truck described above is similar to refuse collection trucks now manufactured by Gar Wood Industries, Inc., Wayne, Mich., the owners of the above-referenced patents. Truck 10, however, differs from existing conventional trucks in that the refuse hopper of existing trucks extends across substantially the entire width of the gate assembly. When existing trucks are operating along a refuse collection route, as in an urban or suburban residential area, the truck is driven in the usual manner by a driver along the curb 40 (see FIG. 1) of a street 41. Containers 42 of refuse are placed adjacent the curb prior to the arrival of the truck; the containers are placed adjacent the curb either by the residents in the homes along the street or by members of the refuse collection crew who work in advance of the truck. When the truck arrives adjacent a group of containers, the truck is stopped, and one or more swampers, who either ride on the gate assembly between truck stops or walk beside the truck, empty the contents of the containers into the refuse hopper at the rear of the truck. If the driver of the truck also serves as a swamper, he must walk from the front of the truck to the rear of the truck and back again at each refuse pick-up station. Accordingly, it is apparent that a conventional refuse collection truck does not readily lend itself to efficient operation by a single person who acts both as a driver and as a swamper.

Truck 10 according to this invention, however, is adapted for efficient one man operation, especially in areas where containers of refuse are placed adjacent a curb by persons resident along the refuse collection route. As shown in FIGS. 1 and 2, a platform 45 is provided on gate assembly 25 adjacent hopper side wall 32. A driver support member or seat 46 is disposed over the platform and is fixedly mounted to the gate assembly in the sense that the seat is not readily movable from the gate assembly; the seat may be rotatably mounted to a seat supporting pedestal or bracket 47, if desired. The seat is disposed so that a person seated thereon faces rearwardly of the truck. A control column 48 is mounted to the platform rearwardly of seat 46 and includes a steering wheel 49 and a gearshift lever 50 placed so they are readily accessible to a person supported on the seat. Accelerator and brake pedals 51 are mounted to the platform adjacent the base of the control column. The steering wheel, the gearshift lever, and the foot pedals are coupled to the mechanisms at the front of the truck controlled by these devices by a plurality of hydraulic lines 52, although it will be understood that mechanical, pneumatic or electrical lines may be used in place of hydraulic lines, if desired. The hydraulic lines are enclosed in a protective cover 53 which extends from under the platform to the top of the gate assembly adjacent the top of the refuse storage bin. The hydraulic lines then pass along the upper interior of the bin. Platform 45 is at such a level above the ground that the seat and the controls on the platform are accessible directly from the ground. The gate assembly thus is provided with an auxiliary control station for the truck. The auxiliary control station is disposed wholly within the width of the truck as defined either by the gate assembly or the storage bin.

When truck 10 is operated along a refuse collection route, the driver of the truck leaves cab 16 and mounts the platform. Along the route, the truck is operated from the auxiliary control station in a mode whereby the rear of the truck precedes the truck front end. The driver may thus function efficiently as either the sole swamper or as one of two swampers. Accordingly, the truck as a whole is efficiently operated.

Because of the presence of the auxiliary control station on the gate assembly, refuse hopper 28 is narrower than on existing conventional refuse trucks. The refuse storage bin maintains its full width, however. Thus, only a triangular volume 60 in the bin, directly forwardly of platform 45, is not directly filled with refuse. The angle A which the hypotenuse of the triangular cross-section of the volume makes the bin side wall 33 corresponds to the angle of repose of the refuse in the bin. As refuse in the bin is compacted, however, volume 60 is also filled.

A refuse collection vehicle 60, shown in FIGS. 3, 4, and 5, includes a chassis 61 mounted on rear and front wheels 62 and 63, respectively. An engine 64 is mounted to the chassis adjacent the rear end of the vehicle and is connected to the rear wheels for propelling the vehicle. The engine is mounted within a housing 65 which forms a rearward extension of a refuse storage bin 66 mounted to the chassis forwardly of the engine. The refuse storage bin extends from a transverse movable rear wall or pusher plate 67, normally located just forwardly of the engine to a front end 68 which is open across substantially its entire extent forwardly of the front wheels. The storage bin has a closed top 69 and defines the maximum width of the vehicle. A hydraulic pump, hydraulic reservoir and ram assembly unit 70 preferably is located in housing 65 for moving wall 67 reciprocably along the chassis toward and away from the open end of the bin to discharge from the bin refuse which has accumulated in the bin. Alternatively, a chain drive mechanism may be provided for moving the pusher plate reciprocably of the bin.

The open front end of the bin is encircled by structural members 71 which impart rigidity and structural integrity to the bin. Along the sides of the bin, the structural members slope upwardliy and rearwardly as shown in FIG. 4.

A gate assembly 75 is mounted to the open front end of the refuse storage bin. As shown in FIG. 4, the gate assembly is hingeably mounted at its upper extent to the upper peripheral portion of the open end of the bin 66. The gate assembly has a normal position (represented by the solid line position of the gate assembly in FIG. 4) in which the gate assembly closes the open end of the bin. The gate assembly has structural members 76 around its rearward peripheral extent which mate with the bin structural members when the gate assembly is disposed in its normal positions. The gate assembly also has an open position (shown by the dashed lines in FIG. 4) relative to the bin in which the gate assembly is displaced from its normal closure relation to the bin to a position in which the forward end of the bin is open. The ejection of accumulated refuse from bin 66 may be carried out when the gate assembly is in its open position. An extensible hydraulic ram assembly 77 is connected between the gate assembly and the bin at each side of the bin for moving the gate assembly between its normal and its open positions. Ram assemblies 77 preferably are powered from hydraulic power unit 70 at the rear end of the vehicle.

The refuse ejection mechanism for bin 66 described above may be replaced by a hinged connection between the bin and the front end of the chassis and by an extensible hydraulic ram assembly connected between the bin and the chassis adjacent the rear of the chassis for elevating the rear end of the bin relative to its front end. Such a refuse ejection mechanism is within the scope of this invention and relies upon gravity to produce the actual ejection of refuse from the bin. Regardless of the type of refuse ejection mechanism used, it is apparent that the bin is substantially fixed mounted to the chassis in that it is secured from movement along or transversely of the chassis.

The gate assembly includes a refuse hopper 79 which extends across the front of the gate assembly (and the front of the vehicle) from just adjacent the right side of the vehicle toward the left side of the vehicle. The hopper is equipped with a movable cover plate 80. The refuse hopper is positioned on the gate assembly conveniently to receive refuse from a container (such as container 87) held at a comfortable position by a swamper/operator. The refuse hopper also is provided with a refuse transfer and compactor mechanism (not shown since such structure is conventional and does not, per se, form a part of this invention) which is periodically operated to transfer refuse received in the hopper to the interior of the refuse storage bin.

Laterally of the refuse hopper, i.e., between the left end of the hopper and the left side of the vehicle, an enclosed vehicle control station or cab 82 is fixedly mounted to the gate assembly. The cab is equipped with a door 83 through which a swamper/operator of the vehicle may enter the cab from the left side of the vehicle. The door may be swung open flush against the side of the vehicle (as shown in dashed lines in FIG. 3) when the vehicle is operating on a refuse collection route. Within the cab are located a steering wheel, accelerator and brake pedals, a gear shift and a seat for the vehicle operator, together with other auxiliary controls for controlling the operation of the vehicle. The mechanism for powering the refuse transfer and compactor may be located on the gate assembly behind the cab if desired. These vehicle controls are coupled to the appropriate controlled mechanisms via suitable mechanical, hydraulic, electrical, or pneumatic lines extended to the bin and beyond via the gate assembly hinges, as shown in FIG. 2.

FIG. 3 illustrates the operation of vehicle 60 on a refuse collection route. The vehicle is driven between refuse collection stations along the left curb 85 of a residential street 86 or the like. At each collection station one or more refuse laden containers 87 are positioned adjacent the curb; as noted above, the containers are placed in this location either by the residents in the homes along the street or by members of the refuse collection crew who work in advance of the vehicle. The vehicle, however, is manned by only one person, and this person functions both as the driver of the vehicle and as a swamper for loading refuse into hopper 79. Such duties can be performed efficiently by one person since, when vehicle 60 arrives at a refuse collection station, cab 82 is located adjacent the curb and it is only a short distance from the cab to the refuse containers to the hopper.

Preferably, especially where the vehicle is owned and operated by a governmental body capable of modifying usual traffic ordinances for its own benefit, the vehicle is driven along the left curb, thereby further improving the efficiency of the refuse collection operation. The left hand drive also has recognized advantages when the vehicle is operated on streets and highways to and from refuse collection or disposal sites.

Vehicle 90, shown in FIGURES 6 and 7, is similar to refuse collection vehicle 60, but differs from vehicle 60 in that it includes a gate assembly 91 which defines only a refuse hopper 92. The gate assembly extends across the front end of the vehicle from the right side of the vehicle to a hopper side wall 93 disposed toward but not to the left side of the vehicle. The gate assembly includes a suitable mechanism for transferring refuse from the hopper to a bin 94 mounted to the vehicle chassis rearwardly of the gate assembly. The bin opens to the hopper only across that portion of the bin (the bin having a width substantially equal to the maximum width of the vehicle) which lies directly rearwardly of the hopper when the gate assembly is in its closed position relative to the bin as shown in solid lines in FIG. 6.

A vehicle control cab 95 is fixedly mounted to the bin and to the vehicle chassis immediately to the left side wall of the gate assembly. The cab lies within the maximum transverse width of the vehicle. Since the cab is fixed to the bin and to the chassis, a refuse guide plate 96 is disposed in the right front corner of the bin immediately behind the cab. The guide plate is inclined to the length of the vehicle from the right rear corner of the cab at an angle correspondingly approximately to the angle of repose of uncompacted refuse accumulated in the bin, and extends between the top and bottom surfaces of the bin.

As shown in FIG. 7, the gate assembly is hinged to the bin for movement into and out of closure relation to the open front end of the bin in response to operation of a gate assembly swinging mechanism (not shown) such as a hydraulic ram. The gate assembly is hinged at 97 to the right front side margin of the bin for movement about either a substantially vertical axis or a rearwardly inclined axis. It will be understood, however, that the gate assembly could be hinged to the top front margin of the bin (as shown in FIG. 4, for example) without departing from the scope of the invention. A locking mechanism (not shown) is provided for securing the gate assembly in closure relation to the bin. Preferably the locking mechanism cooperates between the left side of the gate assembly and the vehicle control cab.

Bin 94 is rigidly mounted to the chassis of vehicle 90. A refuse pusher plate 98 is mounted to the forward end of an extensible hydraulic ram 99 and normally is disposed at the rear of bin 94 just forwardly of vehicle engine 100. In lieu of the ram, an endless chain drive device may be used to move the pusher plate. The pusher plate extends between the top and bottom of the bin and from the right side of the bin toward but not to the left side of the bin. A pusher plate extension member 101 is movably mounted to the pusher plate and extends from the left side of the pusher plate to the bin left side along the vertical extent of the pusher plate. The extension plate is guided in its movement laterally of the vehicle by a guide rod 102 connected between the pusher and extension plates on the side of the pusher plate toward engine 100. A spring 103, or a hydraulic ram, if desired, biases the extension plate away from the pusher plate and into engagement with the bin left side wall. The extension plate at its end adjacent the bin side wall has a rearwardly extending flange adapted to bear against the bin left side wall and to which the spring or ram is connected.

When it is desired to eject from the bin a quantity of refuse accumulated in vehicle 90, the gate assembly is swung out of closure relation to the front end of the bin into the position shown in FIG. 6 in dashed lines. Ram 99 is extended, or the chain drive mechanism is operated, to push refuse out the front of the bin. If desired, an interlock may be provided between the gate assembly power swing mechanism and the pusher plate drive mechanism to prevent operation of the pusher plate drive mechanism until the gate assembly has been moved clear of the open front end of the bin. The pusher and extension plates move toward the front of the vehicle along suitable guides (not shown, but see elements 116 in FIG. 8) located in the bin. Initially the extension plate is not moved relative to the pusher plate. As the pusher plate approaches the front end of the bin, however, extension plate engages guide plate 96 and commences to ride along the guide plate, thereby causing the extension plate to move toward the right against the bias of spring 103. In the case of the use of a double acting hydraulic cylinder (see FIG. 9), the hydraulic mechanism is operated to move the extension plate. In this manner, the pusher plate is moved to the extreme front of the bin by ram 99 and all refuse accumulated in the bin is ejected therefrom.

As shown in FIG. 7, the vehicle includes a compartment 105, located immediately rearwardly of cab 95, for transporting a swamper in the event a two-man crew is desired for the vehicle.

Refuse collection vehicle 110, shown in FIG. 8, like vehicles 60 and 90, includes an engine 111 mounted to a chassis at the rear of the vehicle and a bin 112 mounted to the chassis forwardly of the engine. The bin is open across its entire transverse and vertical extent to the front of the truck. A gate assembly 113 (like gate assembly 91), including a refuse hopper 92, is hinged to the right front side margin of the bin for movement into and out of partial closure relation to the open end of the bin. A control cab 114 is hingeably mounted to the left front side margin of the bin for movement into and out of partial closure relation to the open end of the bin. The gate assembly and the cab cooperate to completely close the bin. The cab includes all controls necessary for driving the vehicle and is fitted on its left side with a door (like door 83) so that a swamper/operator may enter the cab. The gate assembly and the cab are hingeable relative to the bin about vertical or rearwardly inclined axes, and are moved by operation of suitable drive mechanisms (not shown for the sake of clarity of illustration) preferably of the double acting hydraulic ram type.

A pusher plate 115 is disposed within the bin and extends vertically across the entire internal cross-sectional area of the bin. The pusher plate is movable along the length of the bin on guides 116 in response to the operation of an extensible ram 117 or a chain drive mechanism for ejecting collected refuse from the interior of the bin. Preferably the pusher plate drive mechanism is operated from controls at the rear of the vehicle.

FIG. 9 shows another refuse ejection mechanism which may be used in a refuse truck 120 like truck 60 having a fixed cab 121 and a movable gate assembly 122. FIG. 9 shows the gate assembly hinged to the right side margin of bin 123, but obviously, in view of the foregoing, the gate assembly could be hinged to the top of the bin. A suitable mechanism, such as a hydraulic ram (not shown) is coupled between the bin and the gate assembly for moving the gate assembly into and out of closure relation to the bin. Refuse storage bin 123 opens to the front of the truck and is closable by the gate assembly. The ejection mechanism includes a pusher plate 124 which extends from top to bottom of the bin and from the right side of the bin to a point just short of a rearward extension of the right side of cab 121. The pusher plate is movable reciprocably along the bin by a hydraulic ram or a continuous chain drive device, not shown. The pusher plate carries an extension plate 124 which, in its fully extended position relative to the pusher plate as shown in solid lines in FIG. 9, extends to the left side wall of the bin and from top to bottom in the bin. A double acting hydraulic ram assembly 126 is connected between the rear sides of the pusher and extension plates for moving the extension plate toward and away from the bin left side wall. No refuse deflector plate like plate 96 is fitted in the bin rearwardly of the cab. Instead, the left side of the extension plate carries a flange 127 which extends forwardly of the extension plate parallel to the bin left side wall. Preferably the flange extends forwardly from the extension plate a distance equal to the distance subtended along the bin left side wall by an imaginary line inclined to the length of the bin from the cab right rear corner at an angle approximately equal to the angle of repose of uncompacted refuse accumulated in the bin.

When the ejection of refuse from bin 123 is commenced, the extension plate flange is engaged slidably with the bin left side wall at the rear of the bin. The pusher plate drive mechanism is operated to advance the pusher and extension plates toward the front of the bin until the forward edge of flange 127 is at or almost at the left front corner of the bin. During such movement of the pusher plate, the bulk of the refuse accumulated in the bin is ejected through the open front end of the bin. Ram 126 is then operated to move the extension plate away from the left side wall of the bin, thus causing the flange to move any refuse present between the extension plate and the rear of the cab toward the bin outlet opening. When the flange clears the left side of the bin opening normally closed by the gate assembly, the forward movement of the pusher plate is resumed so that the remaining refuse in the bin is ejected from the bin. Preferably the operation of ram 126 and the operation of the pusher plate drive mechanism are automatically sequenced during this process.

After refuse ejection is completed, the pusher plate is returned to the rear of the bin. Preferably, the extension plate is moved back into engagement with the bin left side wall after the pusher plate is returned to the rear of the bin, thereby assuring that no refuse which may remain in the left front corner of the bin is dragged to the rear of the bin as might happen if the extension plate were sooner moved into its normal position.

Each of vehicles 10, 60, 90, 110 and 120 have the feature that they are constructed for most efficient operation, both on the highway and on a refuse collection route, by one or, at the most, two persons, thereby providing lower cost refuse collection services than is possible with existing vehicles. Also, it is preferred that the control station adjacent the refuse hopper in each of the vehicles described above include a positive pressure sensitive control apparatus coupled to the steering and braking mechanisms for stopping the vehicle in the event that the operator should suddenly become incapacitated during motion of the vehicle. The control apparatus are of the "fail-safe" type and are commonly known as "dead man controls."

There has been described above a simple, novel and effective invention which provides a significant increase in the efficiency and effectiveness of operation of refuse collection vehicles. This description, however, has been presented merely by way of explaining presently preferred embodiments of the invention, and is not to be considered as limiting the scope of the invention since the structures described may be altered or modified without departing from the scope of the invention.

What is claimed is:

1. A refuse collection vehicle comprising a wheeled chassis, means for propelling the vehicle including an engine mounted to the chassis adjacent one end thereof, a refuse storage bin mounted to the chassis and extending from adjacent the engine to the other end of the chassis, the bin extending across the width of the chassis and defining substantially the maximum width of the vehicle, the bin being open at the other end of the chassis, a gate assembly mounted to the storage bin and extending across the bin transversely of the vehicle for partially closing the open end of the bin, means hingeably mounting the gate assembly to one side of the bin at the other end of the chassis, selectively operable means connected between the bin and the gate assembly operable for moving the gate assembly hingeably relative to the bin into and out of said partial closure relation to the bin in which the gate assembly extends from the bin one side toward the bin other side, refuse hopper means carried by the gate assembly for receiving refuse and for transferring received refuse to the bin, a vehicle control station for an operator of the vehicle disposed laterally of the refuse hopper means and substantially within the maximum width of the vehicle, the control station including means operable for the operator for controlling the direction and rate of vehicle movement, and means hingeably mounting the control station to the other side of the bin for movement into and out of bin closure relation, the gate assembly and the control station cooperating to completely close the bin at said other end of the vehicle.

2. A self-propelled refuse collection vehicle comprising a wheeled chassis, an elongate refuse storage bin mounted to the chassis extending across the width of the chassis and defining substantially the maximum width of the vehicle, the bin being open at a front end of the chassis, a gate assembly mounted to the storage bin and extending partially across the bin transversely of the vehicle from one side of the bin for partially closing the open end of the bin, means hingeably mounting the gate assembly to the bin at the open end thereof, refuse transfer means carried by the gate assembly for receiving refuse and for transferring received refuse to the bin, a single vehicle driving control station for an operator of the vehicle extending from the other side of the bin to the proximate edge of the gate assembly, means hingeably mounting the control station to the bin independently of the gate assembly, and selectively operable means connected between the bin and the gate assembly and between the bin and the control station operable for moving the gate assembly and the control station hingeably relative to the bin into and out of closure relation to the bin, the gate assembly and the control station cooperating to fully close the open end of the bin in refuse collection operation of the vehicle.

3. A vehicle according to claim 2 wherein the gate assembly and the control station are hingeably mounted to opposite sides of the bin for movement relative to the bin about substantially vertical axes.

References Cited

UNITED STATES PATENTS

| 2,879,906 | 3/1959 | Gwinn | 214—83.3 |
| 3,032,216 | 5/1962 | McCarthy | 214—302 |
| 3,089,601 | 5/1963 | Chaney et al. | 214—83.32 |

FOREIGN PATENTS

| 1,022,156 | 1/1958 | Germany. |

ALBERT J. MAKAY, *Primary Examiner.*